(12) United States Patent
Hasegawa et al.

(10) Patent No.: US 11,995,865 B2
(45) Date of Patent: May 28, 2024

(54) ARTICLE POSITION ESTIMATION SYSTEM AND ARTICLE POSITION ESTIMATION METHOD

(71) Applicant: NEC COMMUNICATION SYSTEMS, LTD., Tokyo (JP)

(72) Inventors: Takahiro Hasegawa, Tokyo (JP); Masahito Iwai, Tokyo (JP); Kenichi Abe, Tokyo (JP); Yuichiro Ezure, Tokyo (JP); Tetsuya Ito, Tokyo (JP)

(73) Assignee: NEC Communication Systems, LTD., Tokyo (JP)

( * ) Notice: Subject to any disclaimer, the term of this patent is extended or adjusted under 35 U.S.C. 154(b) by 533 days.

(21) Appl. No.: 17/265,669

(22) PCT Filed: Aug. 8, 2019

(86) PCT No.: PCT/JP2019/031303
§ 371 (c)(1),
(2) Date: Feb. 3, 2021

(87) PCT Pub. No.: WO2020/032157
PCT Pub. Date: Feb. 13, 2020

(65) Prior Publication Data
US 2021/0312660 A1    Oct. 7, 2021

(30) Foreign Application Priority Data

Aug. 9, 2018 (JP) .................................. 2018-150149

(51) Int. Cl.
*G06T 7/73* (2017.01)
(52) U.S. Cl.
CPC ...................................... *G06T 7/74* (2017.01)
(58) Field of Classification Search
CPC ...... G06Q 10/08; G06Q 10/087; G06Q 50/28; G06Q 10/00; G06Q 30/0202;
(Continued)

(56) References Cited

U.S. PATENT DOCUMENTS

| 7,646,336 B2* | 1/2010 | Tan | G01S 19/485 |
| | | | 342/357.31 |
| 8,630,443 B2* | 1/2014 | Tan | G06Q 50/28 |
| | | | 382/103 |

(Continued)

FOREIGN PATENT DOCUMENTS

| JP | 2011-096038 A | 5/2011 |
| JP | 2012-532816 A | 12/2012 |

(Continued)

OTHER PUBLICATIONS

International Search Report for PCT Application No. PCT/JP2019/031303, dated Oct. 29, 2019.

(Continued)

*Primary Examiner* — Ian L Lemieux
(74) *Attorney, Agent, or Firm* — Sughrue Mion, PLLC

(57) ABSTRACT

Article position estimation system comprises: article movement recognition part; reference point recognition part; position information generation part; and article position estimation part. Article movement recognition part generates article movement information including time point when article is taken out by mobile body or time point when article placement is completed by mobile body. Reference point recognition part recognizes reference point and generates reference point recognition information including identification information according to recognized reference point, reference point recognition time point, and information related to recognized reference point. Position information generation part generates information related to position of mobile body at reference point recognition time point based on reference point recognition information. Article position estimation part estimates position of mobile body at the time when article is moved by using at least position of mobile body at reference point recognition time point.

15 Claims, 11 Drawing Sheets

(58) Field of Classification Search
CPC ......... G05D 2201/0216; G05D 1/0274; G05D 1/0297; G05D 1/0027; G05D 1/0088; G05D 1/0225; G05D 1/0246; G05D 1/0291; H04W 4/029; G06T 7/74; G06T 2207/30164; G06T 2207/30204; G06T 2207/30208; G06T 2207/30244; G06T 7/73; B65G 1/1373; B65G 1/137; B66C 13/46; G01C 11/06; G01C 3/00; G06V 10/25; G06V 20/56

See application file for complete search history.

(56) References Cited

U.S. PATENT DOCUMENTS

| | | | |
|---|---|---|---|
| 9,607,285 | B1 | 3/2017 | Wellman |
| 10,475,185 | B1* | 11/2019 | Raghavan ............ G06Q 10/087 |
| 11,120,267 | B1* | 9/2021 | Pellegrino ............. G06V 20/35 |
| 11,328,513 | B1* | 5/2022 | Osherovich .......... G06V 10/751 |
| 11,348,066 | B2* | 5/2022 | Galluzzo ................ B25J 9/0093 |
| 2007/0182556 | A1* | 8/2007 | Rado ......................... G01S 5/02 |
| | | | 700/229 |
| 2009/0066513 | A1* | 3/2009 | Kondo .................... G01S 13/04 |
| | | | 340/572.1 |
| 2011/0010005 | A1 | 1/2011 | Tan et al. |
| 2011/0010023 | A1* | 1/2011 | Kunzig ................ G05D 1/0234 |
| | | | 701/2 |
| 2013/0302132 | A1 | 11/2013 | D'Andrea |
| 2014/0253689 | A1 | 9/2014 | Kumagai et al. |
| 2016/0337810 | A1 | 11/2016 | Nakagawa |
| 2019/0156086 | A1* | 5/2019 | Plummer ............... H04N 23/80 |
| 2022/0058826 | A1* | 2/2022 | Hasegawa ............. G01B 11/00 |

FOREIGN PATENT DOCUMENTS

| | | |
|---|---|---|
| JP | 2014-173990 A | 9/2014 |
| JP | 2015-124023 A | 7/2015 |
| JP | 2015-522493 A | 8/2015 |
| JP | 2015-171933 A | 10/2015 |
| JP | 2016-212050 A | 12/2016 |
| JP | 2017-117188 A | 6/2017 |
| WO | 2015/059740 A1 | 4/2015 |

OTHER PUBLICATIONS

Foundation New Media Development Association, "Survey Research Report Related to Indoor-Positioning Spread and Development", Mar. 2009, Japan.

* cited by examiner

ARTICLE POSITION ESTIMATION SYSTEM AND ARTICLE POSITION ESTIMATION METHOD

DESCRIPTION OF RELATED APPLICATION

This application is a National Stage Entry of PCT/JP2019/031303 filed on Aug. 8, 2019, which claims priority from Japanese Patent Application 2018-150149 filed on Aug. 9, 2018, the contents of all of which are incorporated herein by reference, in their entirety.

FIELD

The present invention relates to an article position estimation system and an article position estimation method.

BACKGROUND

As a method of recording a position of an article such as a business material placed at an arbitrary place, there is a method in which a position of a mobile body that carries an article is acquired; and a position of the mobile body when the article is placed and an identifier of the article are recorded in association with each other. As a method of acquiring the position of the mobile body, there are two methods: an absolute position estimation of acquiring an absolute position; and a relative movement amount estimation of acquiring a relative movement amount.

As the absolute position estimation, there are a satellite positioning (GPS (Global Positioning System) positioning), a positioning using wireless radio wave signals, methods using landmarks (marks, features) that can be recognized by cameras as reference points, and the like.

The satellite positioning (GPS positioning) has an advantage that it is possible to use easily as long as there is even a signal receiver. On the other hand, this method (the satellite positioning) has a disadvantage that it is not possible to receive a signal and does not operate indoors where a satellite enters a blind spot.

A method by proximity positioning or triangulation using the wireless radio wave signal strength (RSSI; Received Signal Strength Indicator) has an advantage that it is possible to use also indoors. On the other hand, the method has a disadvantage that an error of about 15 m may occur due to an influence of interference and multipath (see Non-Patent Literature (NPL) 1).

Also, the method of using landmarks that can be recognized by cameras as reference points has an advantage that it is possible to use indoors and there is not an influence of radio wave interference or multipath. On the other hand, this method has a disadvantage that it is difficult to set a reference point so as to cover desired areas for positioning in terms of physical environment and operational work cost.

As the relative movement amount estimation, there are a method of using an inertia sensor and a method of using images taken by a camera(s).

The method of calculating a measured value of an inertia sensor (for example, an acceleration sensor or a gyro sensor) to acquire an change amount in position and direction has an advantage that it is not necessary to set an apparatus or a reference point for positioning on a moving area side. On the other hand, the method has a disadvantage that: the accuracy deteriorates due to drift; cooperation with absolute position estimation is required in order to obtain an absolute position; and a continuity of a movement amount is interrupted if a processing is stopped.

Similarly, the method of using the feature value extracted from the image taken by the camera(s) has an advantage that it is not necessary to set an apparatus or a reference point for positioning on a moving area side. On the other hand, the method also has a disadvantage that: an accuracy deteriorates due to drift; cooperation with absolute position estimation is required in order to obtain an absolute position; and a continuity of a movement amount is interrupted if a processing is stopped. Also, the position estimation method using the image taken by the camera(s) has a disadvantage that: a processing load is high; and a power consumption is large.

Patent Literature (PTL) 1 discloses a technique that comprises: extracting features by using a camera and a laser scanner in combination; estimating a position of a mobile body; and generating a 3D (Three Dimensions) model. Since the technique disclosed in PTL 1 also uses an image taken by a camera, the technique also has the above-mentioned disadvantage.

PTL 2 discloses a technique that an environmental map is updated and the environmental map is used for position estimation. The technique of PTL 2 aims at improving an accuracy and a real-time property of updating an environmental map.

PTL 3 discloses a technique in which a container is associated with a cargo handling apparatus that is a mobile body. The technique of PTL 3 aims at guaranteeing an accuracy of associating a mobile body with a container.

[PTL 1] JP2014-173990A
[PTL 2] JP2015-171933A
[PTL 3] JP2012-532816A
[NPL 1] Foundation New Media Development Association, "Survey Research Report Related to Indoor-Positioning Spread and Development", March 2009

SUMMARY

Each disclosure of the above prior art literatures shall be incorporated into the present application by reference. The following analysis was made by the present inventors.

As mentioned above, there are advantages and disadvantages to the absolute position estimation and the relative movement amount estimation, respectively. In particular, the relative movement amount estimation has a disadvantage that if the estimation process is stopped, the continuity of the movement amount is interrupted, thus the positioning is required always, the processing load is high, and a power consumption is large. That is, in the relative movement amount estimation using the image taken by the camera, a processing load of a calculation apparatus (computer) is high and a power consumption is large. For this reason, a method in which both the absolute position estimation and the relative movement amount estimation are used together is often used.

For example, a method of using both an absolute position estimation using a landmark recognizable by a camera as a reference point and a relative movement amount estimation using the feature value extracted from an image taken by a camera might be considered. However, for a purpose of recording an article placement position, a position to be acquired is limited to the article placement position, and obtaining a position of the mobile body is merely a means of obtaining the article placement position. In other words, the position at which the article was finally placed is important, and there is no need for information such as the route taken before the article was placed. It can be said that in a method of calculating all movement paths of an article by using both an absolute position estimation and a relative position estimation, electric power or the like is wasted for calculating information that is not finally required.

It is a main object of the present invention to provide an article position estimation system and an article position estimation method that contribute to reducing an execution of relative movement amount estimation entailing that a processing load is high and a power consumption is large.

According to a first aspect of the present invention or the disclosure, an article position estimation system is provided, wherein the article position estimation system comprises: an article movement recognition part that generates article movement information including an article movement time point that is a time point when an article is taken out by a mobile body or a time point when the article placement is completed by the mobile body; a reference point recognition part that recognizes a reference point and generates reference point recognition information including identification information according to the recognized reference point, a reference point recognition time point, and information related to the recognized reference point; a position information generation part that generates information related to a position of the mobile body at the reference point recognition time point based on the reference point recognition information; and an article position estimation part that estimates the position of the mobile body at the article movement time point by using at least the position of the mobile body at the reference point recognition time point.

According to the second aspect of the present invention or the disclosure, an article position estimation method is provided, in an article position estimation system, wherein the article position estimation method comprises: generating article movement information including an article movement time point that is a time point when an article is taken out by a mobile body or a time point when the article placement is completed by the mobile body; recognizing a reference point and generating reference point recognition information including identification information according to the recognized reference point, a reference point recognition time point, and information related to the recognized reference point; generating information related to a position of the mobile body at the reference point recognition time point based on the reference point recognition information; and estimating the position of the mobile body at the article movement time point by using at least the position of the mobile body at the reference point recognition time point.

According to the aspects of the present invention or the disclosure, there is provided an article position estimation system and an article position estimation method that contribute to reducing an execution of relative movement amount estimation entailing that a processing load is high and a power consumption is large.

PREFERRED MODES

Figure 1:
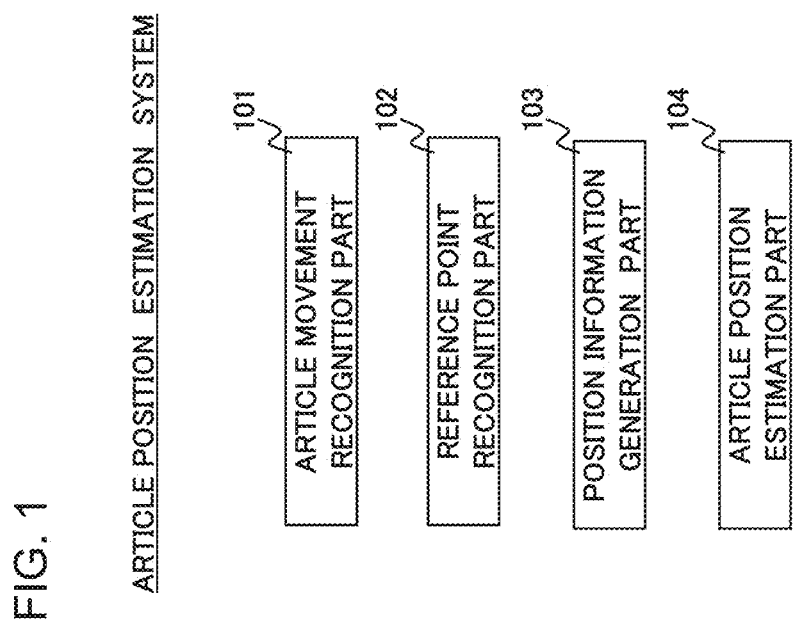
FIG. 1 is a diagram for explaining an outline of one exemplary embodiment.

First, an outline of one exemplary embodiment will be described. It should be noted that drawing reference numerals added to this outline are added to each element for convenience as one example to aid understanding, and description of this outline is not intended to limit anything. Also, connecting lines between blocks in each figure include both bidirectional and unidirectional. One-way arrows schematically show a flow of a main signal (data), and does not exclude bidirectionality. Further, in the circuit diagram, block diagram, internal configuration diagram, connection diagram, etc. shown in the disclosure of the present application, although not explicitly stated, an input port and an output port exist at the input end and the output end of each connection line, respectively. The same applies to input/output interfaces.

An article position estimation system according to one exemplary embodiment comprises an article movement recognition part 101, a reference point recognition part 102, a position information generation part 103, and an article position estimation part 104 (see FIG. 1). The article movement recognition part 101 is a means (article movement recognition means) of generating article movement information including a time point when the article is taken out by the mobile body or the time point when the article placement is completed by the mobile body. The reference point recognition part 102 is a means (reference point recognition means) of recognizing a reference point and generating reference point recognition information including the recognized reference point identification information, the reference point recognition time point, and information related to the recognized reference point. The position information generation part 103 is a means (position information generation means) of generating information related to a position of the mobile body at the reference point recognition time point based on the reference point recognition information. The article position estimation part 104 is a means (article position estimation means) of estimating a position of the mobile body at the article movement time point by using at least the position of the mobile body at the reference point recognition time point.

In the article position estimation system according to one exemplary embodiment, when estimating an article take-out position and an article placement position by the mobile body, between a position estimation by an absolute position estimation and a use of both the absolute position estimation and a relative position estimation are switched as necessary. That is, depending on a nature of the system, there are a case where it is sufficient to be able to roughly grasp the article take-out position and the article placement position, and a case where it is desired to grasp their positions with high accuracy. When the article position estimation system does not require the accuracy of position estimation, the position of the mobile body estimated from the reference point (nearest reference point) near the article take-out position or the article placement position is calculated as the above-mentioned "article take-out position" or "article placement position". As a result, it is not necessary to perform relative movement amount estimation, which has a high processing load and high power consumption. Alternatively, when the accuracy of position estimation is required, the article position estimation system uses both the absolute position estimation and the relative position estimation. Concretely, as described below, the article position estimation system uses both the absolute position estimation based on the reference point recognition and the relative movement amount estimation based on a movement history (movement trajectory) of the mobile body to estimate the article placement position and the like. At that time, the article position estimation part 104 is used for estimating the article placement position only for a minimum movement range in which the article placement position can be estimated (for example, the movement trajectory of the mobile body between the reference point recognized immediately before or after the article placement and the article placement position, etc.). Here, "the reference point recognized immediately before or after the article placement" is, more accurately, the last recognized reference point among the reference points recognized before the article placement time point, or the first recognized reference point among the reference points recognized after the article placement time point". As a result of the above estimation, only the minimum movement history information is a calculation (proceeding) target of the relative movement amount estimation, and the power consumption required for the article placement position estimation is reduced. As described above, the article position estimation system realizes the article placement position estimation in which high load processing and power consumption are reduced.

Below, specific exemplary embodiments will be described in more detail with reference to the drawings. In each exemplary embodiment, the same configuration elements are designated by the same reference numerals, and the description thereof will be omitted.

First Exemplary Embodiment

The first exemplary embodiment will be described in more detail with reference to drawings.

Figure 2:
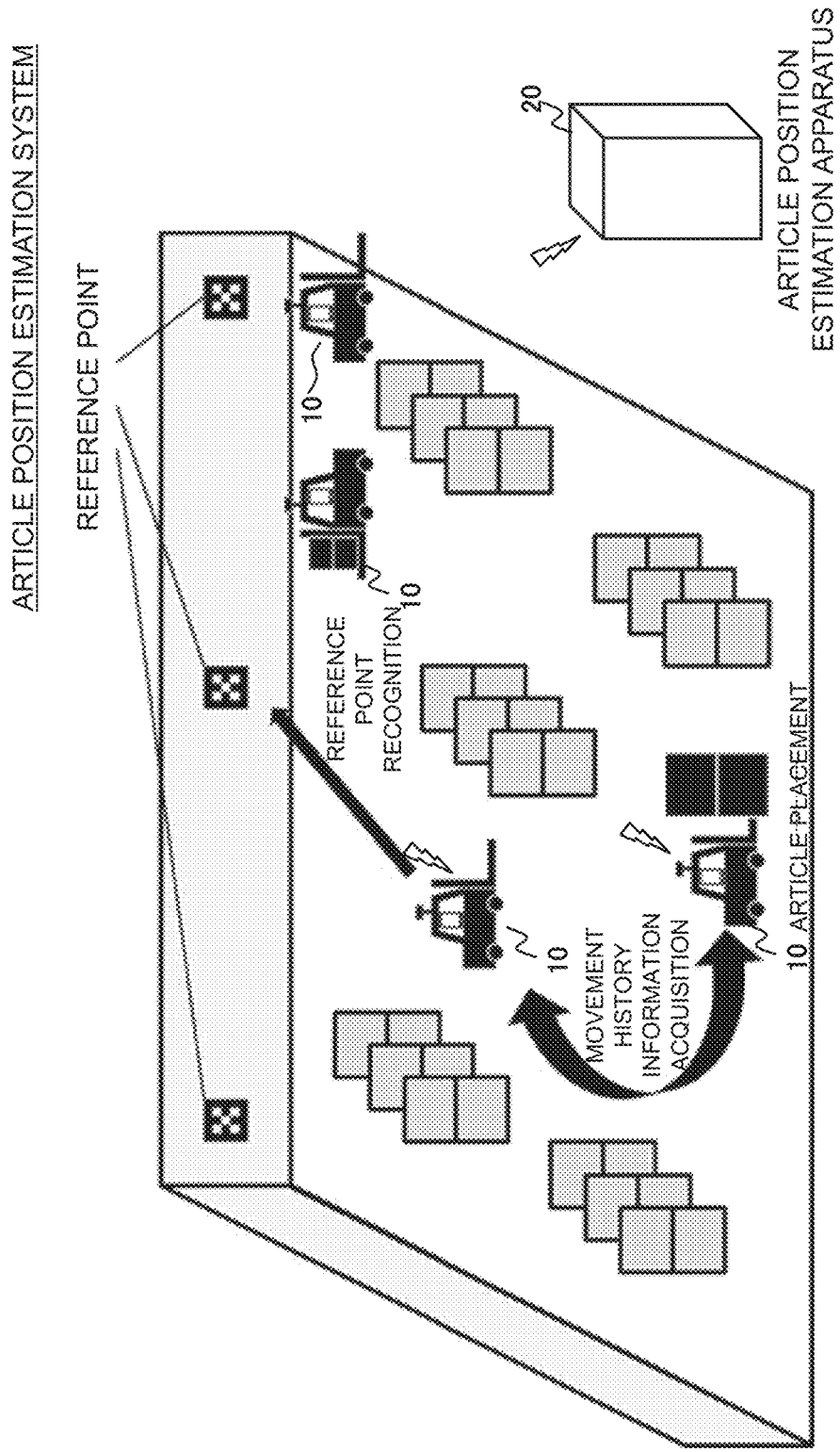
FIG. 2 is a diagram showing one example of a schematic configuration of an article position estimation system according to a first exemplary embodiment.

FIG. 2 is a diagram showing one example of a schematic configuration of an article position estimation system according to the first exemplary embodiment. Referring to FIG. 2, the article position estimation system comprises: a plurality of mobile bodies 10; and an article position estimation apparatus 20.

The mobile body(ies) 10 and the article position estimation apparatus 20 are connected by wire or wireless, and are configured to enable communication (data transmission/reception) with each other. In the first exemplary embodiment, a position at which the article placement is by the mobile body 10 is estimated by the article position estimation apparatus 20. That is, the article position estimation apparatus 20 estimates a placement position after the mobile body 10 has moved the article based on information obtained from the mobile body 10.

The article is, for example, a container(s) stacked on pallet. The article may be a cardboard box, a box, a machine or an apparatus.

As shown in FIG. 2, the article position estimation system includes a plurality of reference points. The reference point is, for example, a marker. Specific examples of the marker include an ArUco marker, a barcode, a QR code (registered trademark), and a chameleon code.

Each reference point has one coordinate information. When the mobile body 10 recognizes the reference point, the mobile body 10 is configured to be able to acquire coordinate information associated with the recognized reference point. Concretely, the coordinate information associated with the reference point (identifier of the reference point) is stored in advance in the storage part of the mobile body 10. The identifier of the reference point is, for example, a numerical value or the like assigned to a bit pattern of the ArUco marker when the ArUco marker is used as the reference point.

Coordinate information has at least absolute coordinate(s). The coordinate system of absolute coordinate(s) may be a coordinate system or latitude and longitude with an arbitrary position (for example, an entrance) as the origin. In a case where the reference point is a marker, it is conceivable that the coordinate information may include a direction and a size of the reference point (scale information). This presumes that a position and a direction of a camera that recognizes the reference point can be calculated by the Perspective-n-point method.

Alternatively, the reference point may be information that associates a structure object with a feature value extracted from an image. This presumes that instead of providing markers, existing pillars, shelves, lockers, posters, etc. will be used instead of markers.

Figure 3:
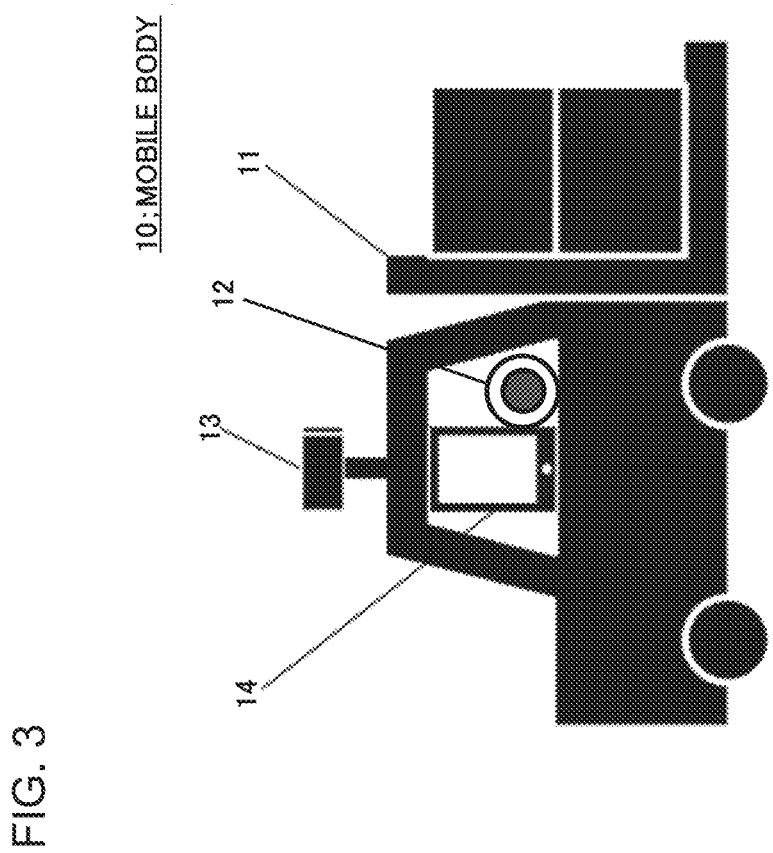
FIG. 3 is a diagram showing one example of an appearance of a mobile body according to the first exemplary embodiment.

FIG. 3 is a diagram showing one example of an appearance of the mobile body 10. The mobile body 10 is, for example, a forklift. The mobile body 10 may be a transport cart or a "person".

The mobile body 10 comprises: an article transportation placement apparatus 11; an article movement notification apparatus 12; an external status acquisition apparatus 13; and a calculator 14.

Figure 4:
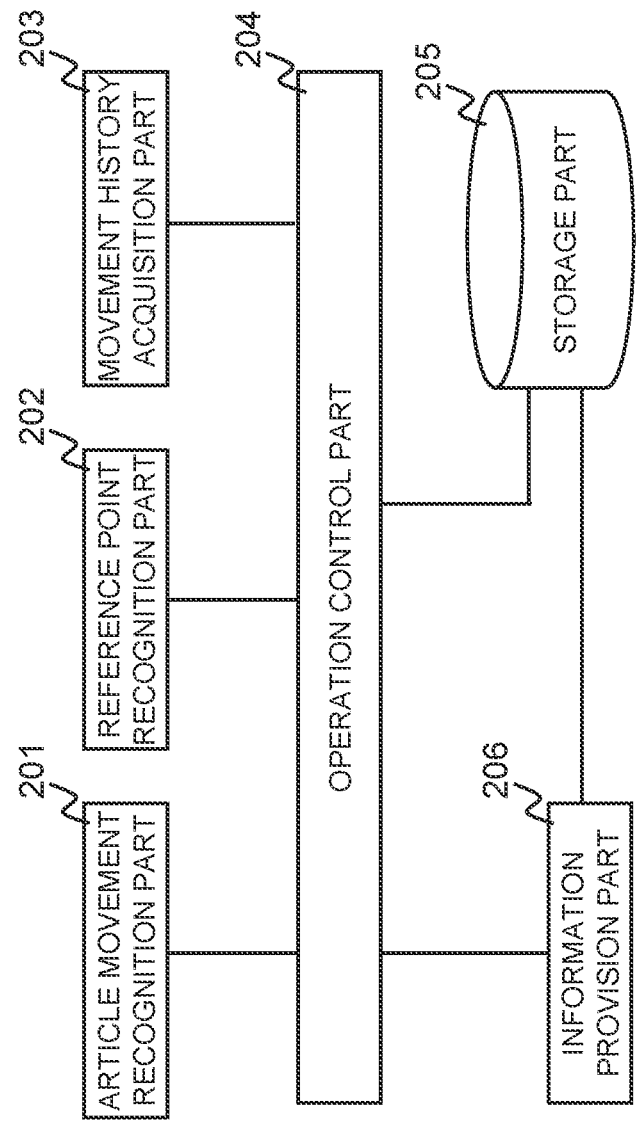
FIG. 4 is a diagram showing one example of a processing configuration of a calculator according to the first exemplary embodiment.

The calculator 14 comprises: an article movement recognition part 201; a reference point recognition part 202; a movement history information acquisition part 203; an operation control part 204; a storage part 205; and an information provision part 206 (see FIG. 4). In FIGS. 3 and 4, a hardware and a processing module for communicating with the article position estimation apparatus 20 are not shown.

The calculator 14 is, for example, a single board computer. Alternatively, the calculator 14 may be a smartphone or a wearable device. The calculator 14 is provided with a CPU (Central Processing Unit), a memory, a storage device, and the like inside, and realizes various processing modules by causing the CPU to execute a program.

Referring to FIG. 3, the article transportation placement apparatus 11 is, for example, a fork of a forklift. Forklifts can lift, transport, and place articles by forks. Alternatively, the article transportation placement apparatus 11 may be a robot arm.

When the mobile body 10 is a transport cart, it is conceivable that a transportation of an article is an operation of pushing/pulling the transport cart, and an article placement is an operation of a person placing the article. When the mobile body 10 is a person, it is conceivable that a transportation and an article placement are an operation in which the person carries the article. In this case, it is conceivable that various processing modules described later is implemented by a smartphone or a wearable device.

The article movement notification apparatus 12 is, for example, a "button" pressed by an operator of the mobile body 10. The calculator 14 and the article movement notification apparatus 12 are connected. The article movement recognition part 201 mounted on the calculator 14 detects a press of the button (article movement notification apparatus 12). In the article position estimation system, an operation rule of "pressing a button when taking out an article or placing an article" is defined. In the first exemplary embodiment, in order to estimate a position at which an article placement is completed by the mobile body 10 in the article position estimation apparatus 20, when the article is placed (the movement of the article is completed), the operator of the mobile body 10 presses the button. The above operation rule is an example, and in the case of a system different from FIG. 2, a different operation rule is defined. That is, the above operation rule is a rule required in the case of the system as shown in FIG. 2.

When the article movement recognition part 201 detects the press of the button, it generates "article movement information". The article movement information includes an article movement time point. The article movement time point is a time point (article take-out time point) at which the article is taken out by the mobile body 10 or a time point (article placement completion time point) at which the article placement is completed by the mobile body 10. In the first exemplary embodiment, in order to estimate the article placement position, the article movement information includes the "article placement completion time". In this way, the article movement recognition part 201 recognizes that the article has been placed at a predetermined position, and generates article movement information including the article placement completion time point, which is a time point at which the article is placed.

The article movement notification apparatus 12 may be a "button" displayed on the smartphone. Alternatively, the article movement notification apparatus 12 may be an inertia sensor. In this case, the article movement recognition part 201 may recognize that the article has been stored from a measured value of the inertia sensor. The inertia sensor includes a gyro sensor, an acceleration sensor, a geomagnetic sensor, a force sensor, a weight sensor, and the like.

Alternatively, the article movement notification apparatus 12 may be a camera. In this case, the article movement recognition part 201 detects that the article has been stored from an image taken by the camera. In this case, the article movement recognition part 201 can be realized by a mobile body recognition program that detects an operation that the article is placed, an operation rule that "takes the placed article", and an image recognition program.

The external situation acquisition apparatus 13 is, for example, a camera. The calculator 14 and the external status acquisition apparatus 13 are connected.

The reference point recognition part 202 implemented on the calculator 14 acquires an image taken by the camera; extracts a feature value; compares the extracted feature value with a feature value of each reference point prepared in advance; and determines whether or not any one of the reference points is detected.

The reference point recognition part 202 generates "reference point recognition information" based on a result of the above determination. The reference point recognition information includes: for example, identification information of the recognized reference point; a time point at which the reference point is recognized (reference point recognition time point); and information related to the recognized reference point. The information related to the recognized reference point is, for example, the image taken at the reference point recognition time point. In this way, the reference point recognition part 202 recognizes the reference point and generates reference point recognition information.

It is presumed that the reference point recognition information is used for calculating a position of the mobile body 10 by the position information generation part 302 of the article position estimation apparatus 20 described later. Alternatively, the reference point recognition information may include: the recognized reference point identification information; a time point at which the reference point is recognized; and a feature value extracted from the taken image upon recognizing the reference point.

In the disclosure of the present application, the "position" of the mobile body 10 or the article includes information related to these coordinates. Further, the "position" of the mobile body 10 or the article may include information related to these directions. That is, the article position estimation apparatus 20 may estimate the "coordinate" of the mobile body 10 or the like, or may estimate the "coordinate and direction" of the mobile body 10 or the like. Alternatively, a predetermined range centered on one point may be treated as a "position". For example, the article position estimation apparatus 20 may estimate a predetermined range centered on one point as the position of the mobile body 10 or the like.

The reference point recognition information may include: information related to a time point at which the reference point is recognized; and a position of the mobile body 10 at that time point. This presumes that the reference point recognition part 202 comprises the position information generation part 302 of the article position estimation apparatus 20, which will be described later.

The movement history information acquisition part 203 of the calculator 14 is a means of acquiring movement history information related to a movement of the own apparatus (mobile body 10). For example, the movement history information acquisition part 203 acquires an image taken by the camera to generate "movement history information". The movement history information is, for example, a set having a pair of the taken image and the image acquisition time point as elements. It is presumed that the movement history information is used to calculate the change amount in the position of the mobile body 10 by the position change information generation part 303 of the article position estimation apparatus 20, which will be described later.

The movement history information acquisition part 203 may acquire a measured value of the inertia sensor and use it as "movement history information". In that case, the movement history information is a set of a pair of the measured value of the inertia sensor and the measured time point. Also, instead of the measured value of the inertia sensor (or in addition to the measured value of the inertia sensor), a measured value by an odometer and movement control information of the mobile body 10 may be included in the movement history information.

Alternatively, the movement history information acquisition part 203 may generate movement history information using a measured value of a laser scanner or LIDAR (Light Detection and Ranging). In this case, the movement history information is a set of a pair of the measured value and the measurement time point of the laser scanner or the LIDAR.

Alternatively, the movement history information may be two time points and an change amount in the position of the mobile body 10 that occurs between the two time points. This is based on a presumption that the movement history information acquisition part 203 comprises the position change information generation part 303 of the article position estimation apparatus 20 described later.

The motion control part 204 acquires, for example, each of the article movement information, the reference point recognition information, and the movement history information from each module and stores them in the storage part 205. Also, the motion control part 204 is a means of controlling the reference point recognition part 202 and the movement history information acquisition part 203.

The operation control part 204 controls an operation (start or stop) of the above module (reference point recognition part 202, movement history information acquisition part 203). An example of the operation of the operation control part 204 (the operation of the mobile body 10) will be described later.

The storage part 205 is, for example, a recording area built in or externally connected to a single board computer. Alternatively, the storage part 205 is a recording area built in or externally connected to the smartphone. In addition, although various media can be considered as the storage part 205, since the purpose is to record information and read the recorded information, any medium can be used.

The storage part 205 stores: the article movement information; the reference point recognition information; the movement history information; and the pair of the identification information and the coordinate information of each reference point.

The information provision part 206 is a means of providing information required by the article position estimation apparatus 20 so as to enable the article position to be estimated by the article position estimation apparatus 20. The information provision part 206 reads out each of the article movement information, the reference point recognition information, the movement history information, and the pair of the identification information and the coordinate information of each reference point from the storage part 205. The information provision part 206 transmits these information to the article position estimation apparatus 20.

At that time, the information provision part 206 extracts all or a part of the reference point recognition information and movement history information as read out, and transmits the extracted information (reference point recognition information, movement history information) to the article position estimation apparatus 20. For example, the information provision part 206 transmits: the reference point recognition information generated based on the reference point recognized immediately before the completion of the article placement (article movement time point); and the moved movement history information acquired between the recognition of the reference point and the completion of the article placement to the article position estimation apparatus 20.

Alternatively, the information provision part 206 transmits: the reference point recognition information generated based on the reference point recognized for the first time after the completion of the article placement; and the movement history information acquired between a time that the article placement is completed and the recognition of the reference point recognized immediately after the article placement is completed, to the article position estimation apparatus 20.

Alternatively, when the reference point is recognized immediately before the placement and the reference point is recognized immediately after the placement based on a time at which the article placement is completed, the information provision part 206 may select information for transmitting based on a data size. Concretely, the information provision part 206 may transmit the reference point recognition information corresponding to information having a small data size among the movement history information acquired during the period by the recognition of the two reference points before and after the article is placed, to the estimation apparatus 20. In this way, in a case where the reference point is recognized before the placement time point and the reference point is recognized after the placement time point, the information provision part 206 may transmit the reference point recognition information corresponding to information having a smaller data size among the two movement history information, to the article position estimation apparatus 20.

In this way, the information provision part 206 transmits: the article movement information; all or part of the reference point recognition information; all or part of the movement history information; and the pair of the identification information of each reference point and the coordinate information to the article position estimation apparatus 20. At that time, the information provision part 206 transmits each of the reference point recognition information and the movement history information so as to be within a minimum necessary range based on a size of the recorded information, to the article position estimation apparatus 20. The information provision part 206 transmits the above information, when the article is placed; when the reference point is detected for the first time after the article is placed; or the like. Alternatively, the information provision part 206 transmits the above information by a request from the article position estimation apparatus 20.

Figure 5:
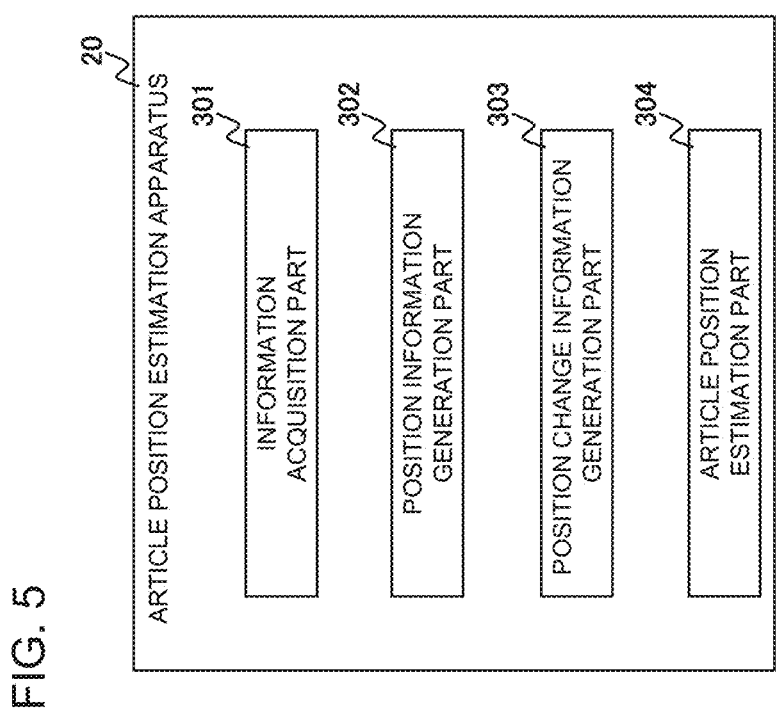
FIG. 5 is a diagram showing one example of a processing configuration of an article position estimation apparatus according to the first exemplary embodiment.

FIG. 5 is a diagram showing one example of a processing configuration (processing module) of the article position estimation apparatus 20 according to the first exemplary embodiment. Referring to FIG. 5, the article position estimation apparatus 20 is configured to comprise: an information acquisition part 301; a position information generation part 302; a position change information generation part 303; and an article position estimation part 304. In FIG. 5, a processing module for communicating with the mobile body 10 is not shown.

The information acquisition part 301 is a means of acquiring information (reference point recognition information, movement history information, etc.) transmitted from the mobile body 10.

The position information generation part 302 is a means of generating information related to a position of the mobile body 10 at the reference point recognition time point based on the reference point recognition information. The position information generation part 302 calculates a position (coordinate and direction) of the camera with respect to the reference point based on a view angle of the camera and a feature value extracted from the taken image of the camera by, for example, the Perspective-n-point method.

The position information generation part 302 calculates a position (absolute coordinate system) of the mobile body 10 at the reference point recognition time point, based on: the calculated coordinate and direction of the camera; and the absolute coordinate and direction of the recognized reference point. That is, the position information generation part 302 calculates the coordinate and direction of the camera based on the recognized reference point (origin point) from the image included in the reference point recognition information. After that, the position information generation part 302 converts the calculated coordinate and direction of the camera into a position (coordinate and direction) of the absolute coordinate system, using the coordinate information (absolute coordinate system) of the recognized reference point.

The position change information generation part 303 is a means of generating information related to the change amount in the position of the mobile body 10 between the reference point recognition time point and the article placement completion time point based on the movement history information, the reference point recognition time point, and the article movement time point (article placement completion time point in the first exemplary embodiment). The position change information generation part 303 extracts a feature value from a plurality of images taken by the camera, and generates a transition (optical flow) of feature points between the images. The position change information generation part 303 calculates the change amount in the coordinate and direction of the camera by generating the transition of the feature point, and treats the change amount in the coordinate and the direction of the camera as the change amount in the position of the mobile body 10 (change amount in coordinates and direction).

Alternatively, when the mobile body history information includes the measured value of the inertia sensor, the position change information generation part 303 calculates the change amount in the position of the mobile body 10 by integrating the measured value of the inertia sensor.

Alternatively, the position change information generation part 303 may calculate the change amount in the position of the mobile body 10 from the measured value of the laser scanner or LIDAR, instead of acquiring the feature point from the image. The position change information generation part 303 may use the reference point recognition information, and the absolute position and the direction of the mobile body 10 as correction information.

The article position estimation part 304 is a means of estimating the position of the mobile body 10 at the article movement time point (article placement completion time point in the first exemplary embodiment) using at least the position of the mobile body 10 at the reference point recognition time point.

For example, in the article position estimation system, in a case where high accuracy related to the position of the article placed by the mobile body 10 is not required, the article position estimation part 304 treats the position of the mobile body 10 at the reference point recognition time point as "article placement position".

On the other hand, in the article position estimation system, in a case where high accuracy related to the position of the article placed by the mobile body 10 is required, the article position estimation part 304 estimates the "article placement position" by the mobile body 10 due to the following method.

Concretely, the article position estimation part 304 estimates the position (absolute coordinate system) of the mobile body 10 at the reference point recognition time point based on: the position of the mobile body 10 at the reference point recognition time point; and the change amount in the position of the mobile body 10 between the reference point recognition time point and the article placement completion time point. That is, the article position estimation part 304 estimates a position (coordinate, direction; absolute coordinate system) at which the article is placed by reflecting the change amount, until the article placement completion time point, onto the position (absolute coordinate system) of the mobile body 10 at the reference point recognition time point.

The article position estimation part 304 changes how to use the change amount reflected in the position of the mobile body 10 based on a situation of the reference point recognition time point and the article movement time point (article placement completion time point). Concretely, when the reference point is recognized first and then the article is placed (reference point recognition time point<article placement completion time point), the article position estimation part 304 reflects the change amount in the forward direction onto the position (absolute coordinate system) of the mobile body 10 (the movement trajectory of the mobile body 10 is traced).

On the other hand, when the article placement is completed first and then the reference point is recognized (reference point recognition time point>article placement completion time point), the article position estimation part 304 reflects the change amount in the opposite direction to the position (absolute coordinate system) of the mobile body 10 by the reference point (the movement trajectory of the mobile body 10 is traced back).

Figure 6:
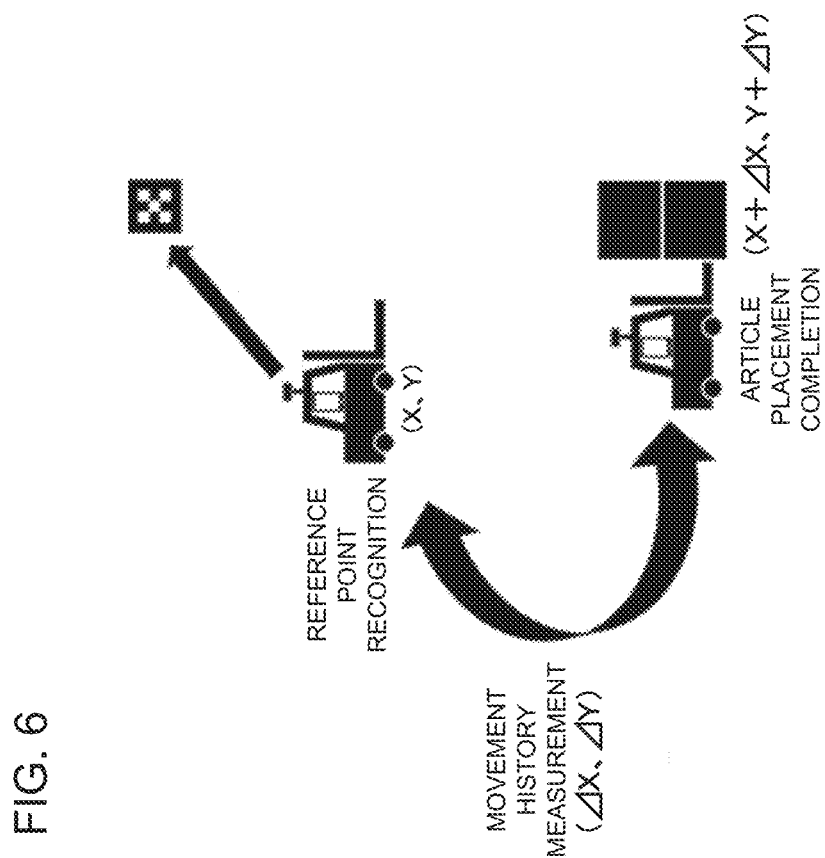
FIG. 6 is a diagram for explaining an operation of the article position estimation apparatus according to the first exemplary embodiment.

Illustrating the operation of the article position estimation apparatus 20, it will be like FIG. 6. When recognizing the reference point, the mobile body 10 generates reference point recognition information. The article position estimation apparatus 20 calculates the position of the mobile body 10 when recognizing the reference point based on the reference point recognition information.

For example, in FIG. 6, the article position estimation apparatus 20 obtains (X, Y) as the position of the mobile body 10. The mobile body 10 moves after recognizing the reference point. At that time, the mobile body 10 moves under accumulating (measuring) information (movement history information) for calculating the change amount in coordinate and direction. The article position estimation apparatus 20 calculates the change amount in the position of the mobile body 10 based on the movement history information. For example, in FIG. 6, the article position estimation apparatus 20 obtains ($\Delta X$, $\Delta Y$) as the change amount related to the coordinate of the mobile body 10. In the example of FIG. 6, the article position estimation in the two-dimensional coordinate system has been described, but of course, the article position estimation in the three-dimensional coordinate system of (X, Y, Z) is also possible. Also, yaw, pitch, and roll can be used as the direction in the three-dimensional coordinate system.

When the article placement is completed, the article position estimation apparatus 20 reflects the change amount obtained from the movement history information between the reference point recognition time point and the article placement completion time point onto the coordinate of the mobile body 10 at the reference point recognition time point, and estimates the position at which the article is placed. For example, in the example of FIG. 6, (X+$\Delta X$, Y+$\Delta Y$) is estimated as the article placement position.

Next, an operation of the article position estimation system according to the first exemplary embodiment will be described.

Figure 7:
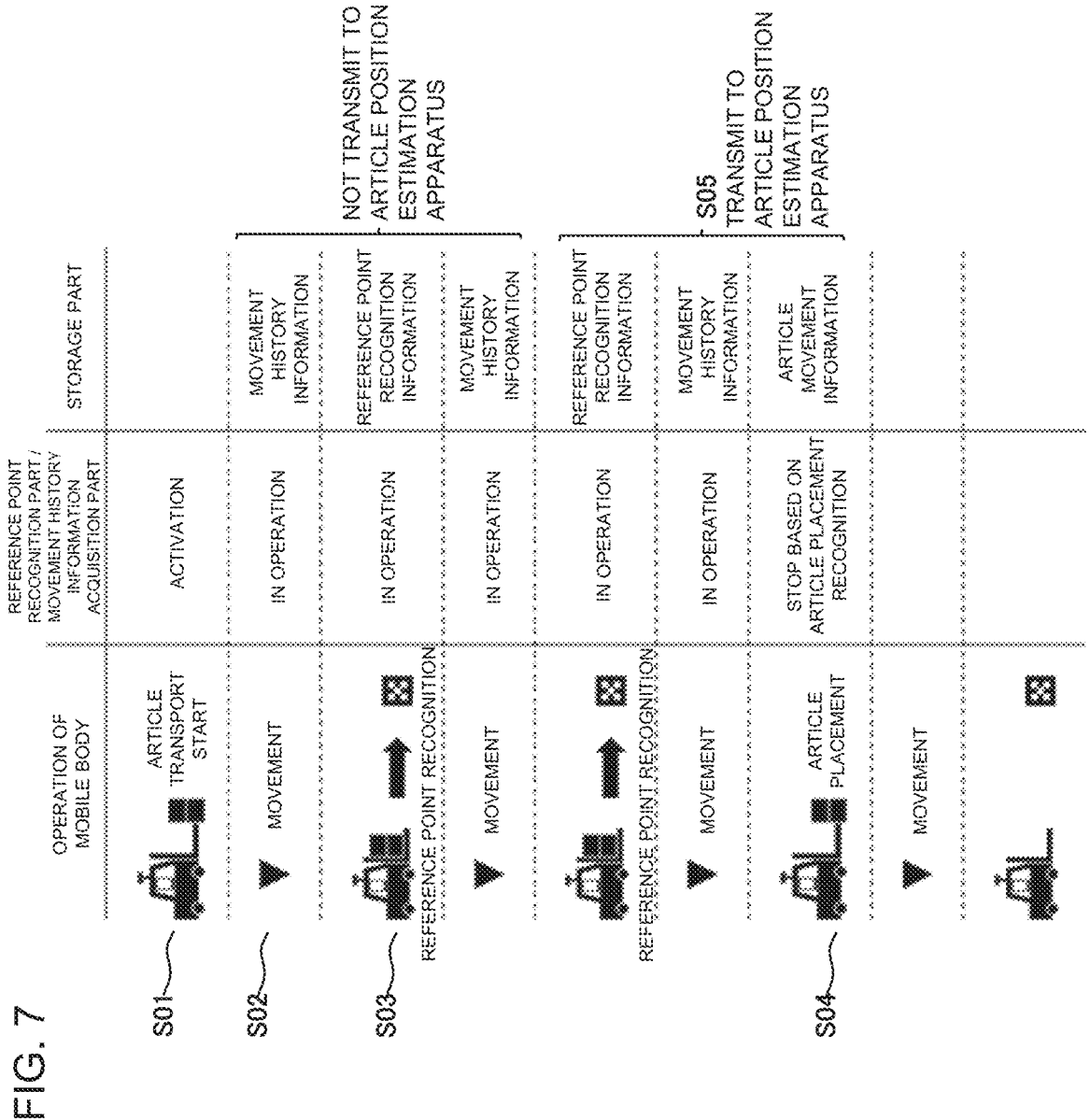
FIG. 7 is a diagram for explaining an operation of the article position estimation system according to the first exemplary embodiment.

A first operation example will be described with reference to FIG. 7. Referring to FIG. 7, the mobile body 10 causes the reference point recognition part 202 and the movement history information acquisition part 203 to operate at a start of transportation of an article (step S01).

The mobile body 10 generates movement history information during transportation of the article and stores it in the storage part 205 (step S02).

When the mobile body 10 recognizes the reference point, the mobile body 10 generates reference point recognition information and stores it in the storage part 205 (step S03).

The mobile body 10 repeats the above process.

When the mobile body 10 moves to the place at which the article is placed and the article is placed, the article movement information is generated and stored in the storage part 205 (step S04). Along with the generation of the article movement information, the mobile body 10 stops operations of the reference point recognition part 202 and the movement history information acquisition part 203.

The mobile body 10 transmits: the reference point recognition information generated by the reference point recognized immediately before the article is placed; the movement history information from the reference point recognition time point until the article placement completion time point; and the article movement information, to the article position estimation apparatus 20 (step S05).

Information other than the information transmitted in step S05 is not transmitted to the article position estimation apparatus 20.

As described above, the article position estimation system acquires and records the information obtained during a part period of a series of operations of the mobile body 10 by the operation of the mobile body 10 shown in FIG. 7 and the operations of the reference point recognition part 202 and the movement history information acquisition part 203. Since the article position estimation apparatus 20 may estimate the article placement position using the information obtained during a part of the period, the power consumption required for the position estimation is reduced.

Figure 8:
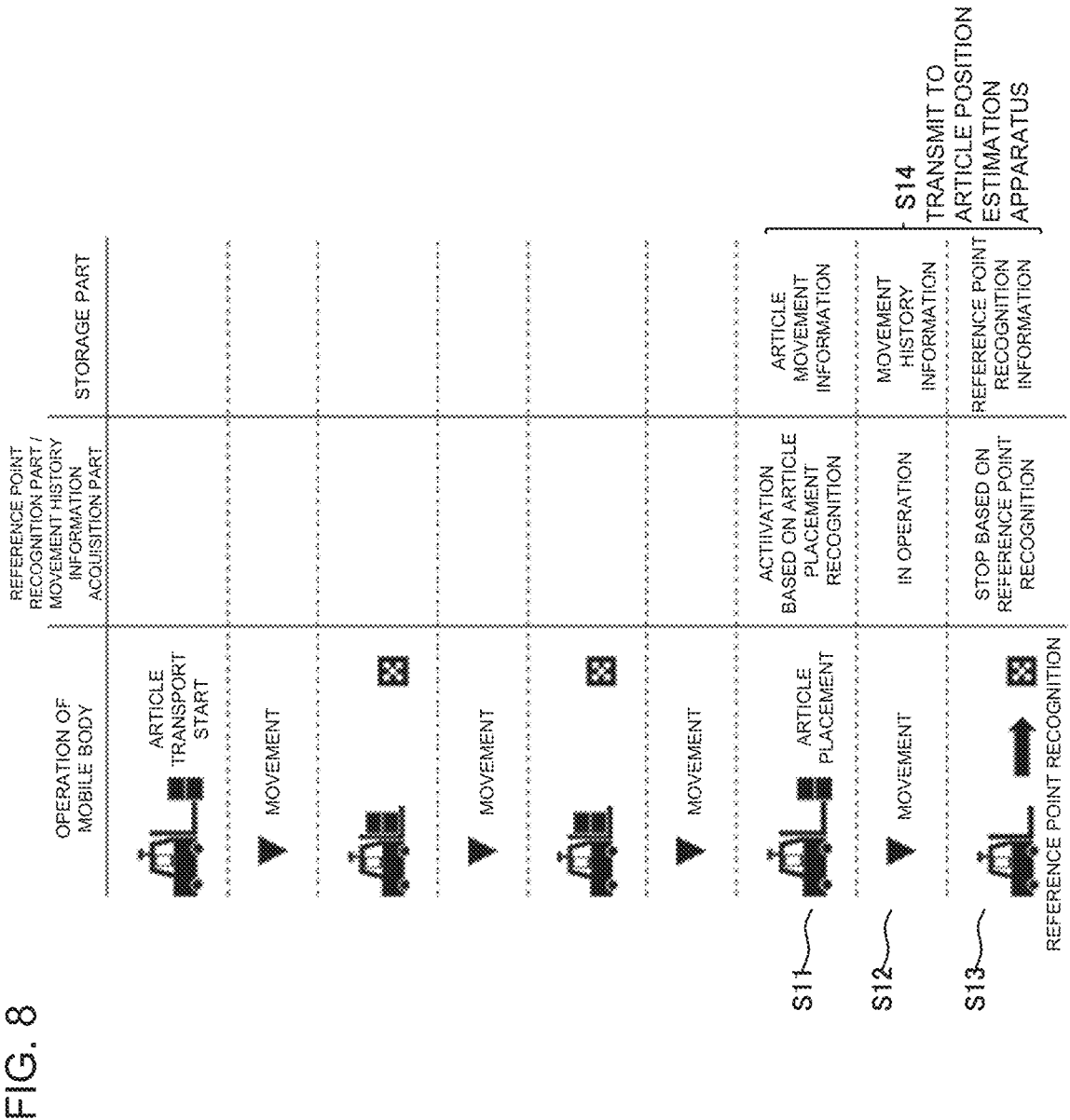
FIG. 8 is a diagram for explaining an operation of the article position estimation system according to the first exemplary embodiment.

A second operation example will be described with reference to FIG. 8. Referring to FIG. 8, when the mobile body 10 completes the article placement, the mobile body 10 activates the reference point recognition part 202 and the movement history information acquisition part 203; generates article movement information; and stores it in the storage part 205 (step S11).

The mobile body 10 generates movement history information during movement and stores it in the storage part 205 (step S12).

When the mobile body 10 recognizes the reference point, the mobile body 10 stops the operation of the reference point recognition part 202 and the movement history information acquisition part 203; and generates reference point recognition information; and stores it in the storage part 205 (step S13).

The mobile body 10 transmits: the reference point recognition information generated by the reference point recognized immediately after the article is placed; the movement history information from the article placement completion time point until the reference point recognition time point; and the article movement information, to the article position estimation apparatus 20 (step S14).

In this way, the mobile body 10 may activate the reference point recognition part 202 and the movement history information acquisition part 203 at an opportunity that the article placement is completed; and then stops the operation of these processing modules at an opportunity that the reference point recognition thereafter. Even in this case, since the article position estimation apparatus 20 may estimate the article placement position using information obtained during a part of the period, the power consumption required for the position estimation is reduced.

Figure 9:
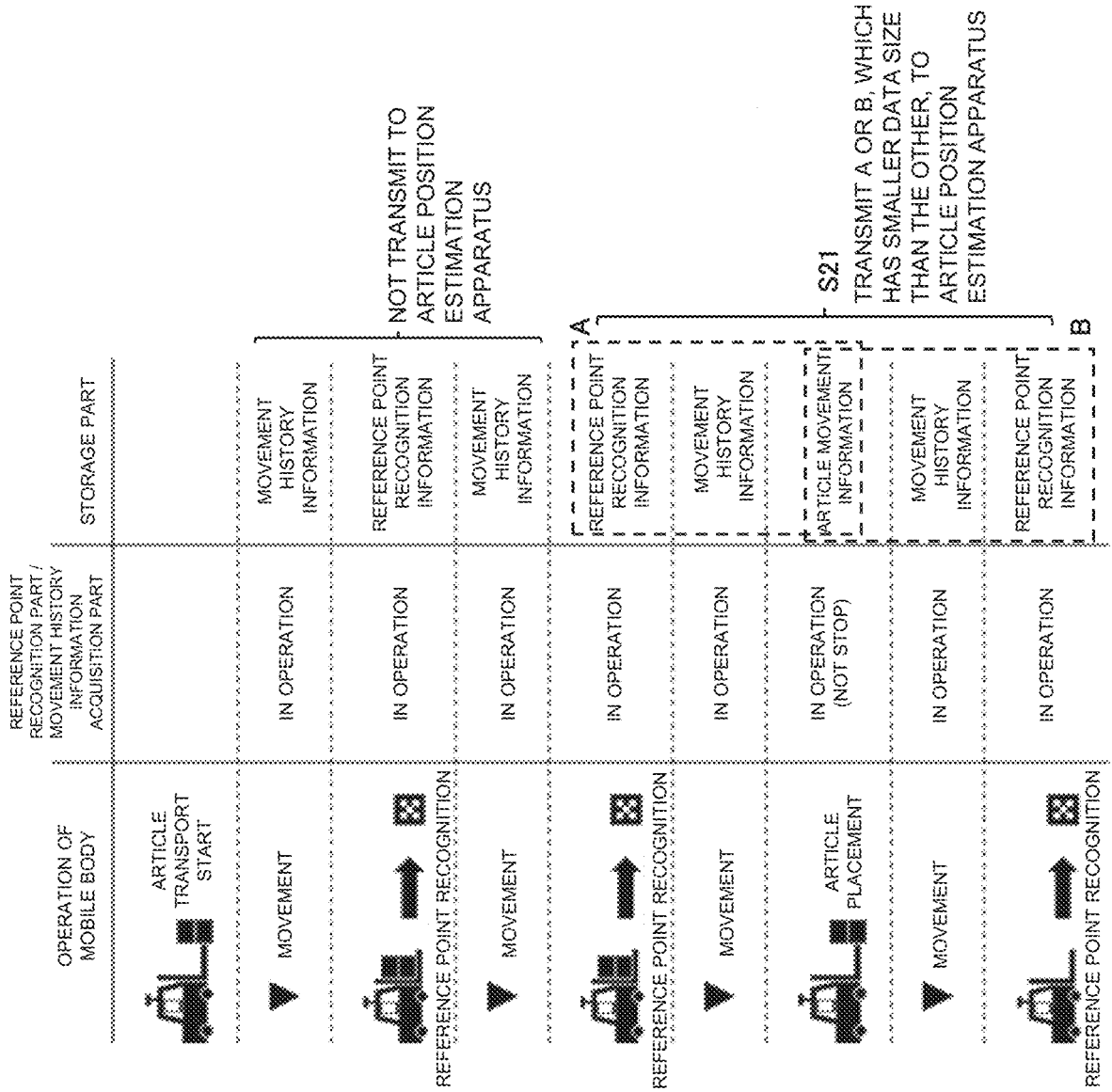
FIG. 9 is a diagram for explaining an operation of the article position estimation system according to the first exemplary embodiment.

A third operation example will be described with reference to FIG. 9. As shown in FIG. 9, the mobile body 10 may continuously perform operations related to reference point recognition and movement history information acquisition.

In this case, the mobile body 10 compares data sizes of the information (reference point recognition information, movement history information) acquired before and after the article placement based on the completion of the article placement, and transmits the smaller data size information to the article position estimation apparatus 20 (Step S21).

Even in this case, since the article position estimation apparatus 20 may estimate the article placement position using the information obtained during a part of the period, the power consumption required for the position estimation is reduced.

Other operation examples (fourth operation example) different from the first to third operation examples will be described. When the time difference between the article placement completion time point and the reference point recognition time point is less than a predetermined threshold value, the article position estimation apparatus 20 may omit the execution of the process of acquiring the change amount in the position of the mobile body 10, and treat the change amount in the position of the mobile body 10 as zero. The threshold is incorporated into the processing module of the article position estimation apparatus 20 as a predefined constant or a dynamically changeable variable.

Any operation among the first to fourth operation examples is adopted by the article position estimation system can be determined in advance, or can be dynamically changed.

Next, a hardware configuration of the article position estimation apparatus 20 will be described.

[Hardware Configuration]

Figure 10:
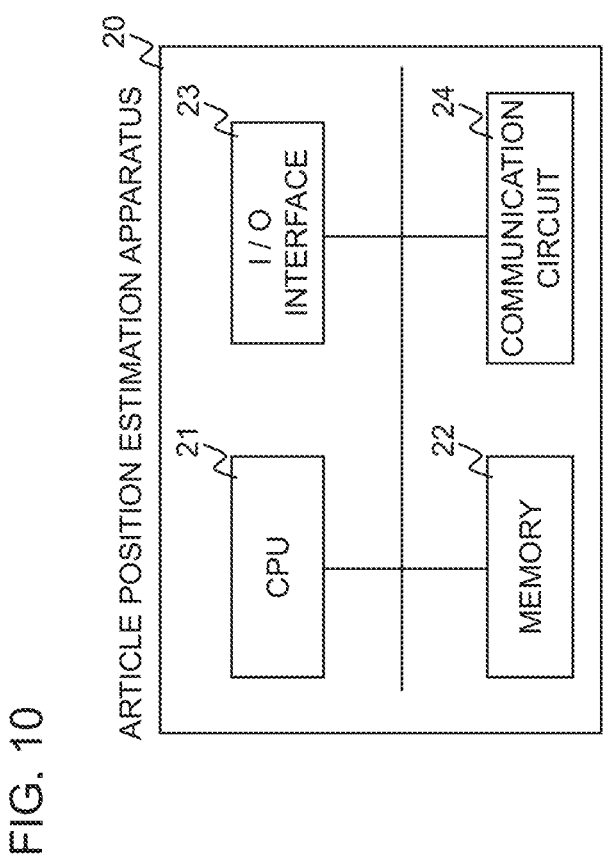
FIG. 10 is a diagram showing one example of a hardware configuration of the article position estimation apparatus according to the first exemplary embodiment.

FIG. 10 is a diagram showing one example of the hardware configuration of the article position estimation apparatus 20. The article position estimation apparatus 20 comprises a configuration exemplarily showing in FIG. 10. For example, the article position estimation apparatus 20 comprises: a CPU (Central Processing Unit) 21; a memory 22; an input/output interface 23; a communication circuit 24 which is a communication apparatus, and the like, which are connected to each other by an internal bus.

However, the configuration shown in FIG. 10 does not mean to limit the hardware configuration of the article position estimation apparatus 20. The article position estimation apparatus 20 may include hardware (not shown). The number of CPUs and the like included in the article position estimation apparatus 20 is not limited to the example of FIG. 10, and for example, a plurality of CPUs 21 may be included in the article position estimation apparatus 20.

The memory 22 is a RAM (Random Access Memory), a ROM (Read Only Memory), an auxiliary storage device (hard disk, etc.), or the like.

The input/output interface 23 is an interface of an input/output device not shown. The input/output device includes, for example, a display device, an operation device, and the like. The display device is, for example, a liquid crystal display or the like. The operating device is, for example, a keyboard, a mouse, or the like.

A function of the article position estimation apparatus 20 is realized by the above-mentioned processing module. The processing module is realized, for example, by the CPU 21 executing a program stored in the memory 22. Also, the program can be downloaded via a network or updated using a storage medium in which the program is stored. Further, the processing module may be realized by a semiconductor chip. That is, the function performed by the processing module may be realized by some kind of hardware or software executed by using the hardware.

[Effect]

As described above, in the article position estimation system according to the first exemplary embodiment, when the accuracy of the position estimation is not required, the article placement position is estimated by the absolute position estimation (for example, the above-mentioned fourth operation example). On the other hand, when the accuracy of position estimation is required, the article position estimation system uses both absolute position estimation based on reference point recognition and relative movement amount estimation based on movement history information (information by momentum measurement, movement (displacement) amount measurement) (for example, the first to third operation examples described above). By properly using such a position estimation method, the relative position estimation with a large power consumption can be reduced, and the power consumption required for the article position estimation can be reduced.

Also, in the article position estimation system according to the first exemplary embodiment, the reference point recognition operation and the momentum measurement operation are performed only in the minimum movement range in which the article placement position can be estimated. As a result, only the minimum movement history information is a calculation target of the relative movement amount estimation, and the power consumption is reduced. That is, in the article position estimation system according to the first exemplary embodiment, it is possible to reduce the calculation resource consumption and the power consumption.

Normal relative movement amount estimation has a disadvantage that when processing is stopped, the continuity of movement amount is interrupted, and thus positioning is required always, and the processing load is high and power consumption is high. On the other hand, in the article placement position estimation, the position to be acquired is the article placement position, and a movement trajectory of the mobile body is not always necessary. In the disclosure of the present application, in view of such situation, only the minimum movement history information is set as the calculation target of the relative movement amount estimation, and the calculation resource consumption and the power consumption are reduced.

Also, in the disclosure of the present application, it is possible to minimize the reference point(s) set (prepared) in the system by using both the absolute position estimation and the relative position estimation. That is, if for the purpose of reducing the above-mentioned calculation resource consumption and power consumption, it is conceivable to set a large number of reference points and acquire the article placement position only by the absolute position estimation due to recognizing the reference points. However, setting the reference points so as to cover an indoor moving area is not always feasible in terms of the physical environment and the work cost of the operator. The article position estimation system according to the first exemplary embodiment can also solve the problem.

Second Exemplary Embodiment

Subsequently, the second exemplary embodiment will be described in detail with reference to the drawings. In the second exemplary embodiment, the position at which the article is taken out by the mobile body 10 is estimated by the article position estimation apparatus 20.

In the first exemplary embodiment, the article position estimation apparatus 20 estimates the article placement position by the mobile body 10. In the second exemplary embodiment, it will be described that the article position estimation apparatus 20 estimates the article take-out position by the mobile body 10.

Since the processing configuration and the like of the mobile body 10 and the article position estimation apparatus 20 according to the second exemplary embodiment can be the same as the configuration of the first exemplary embodiment, the description corresponding to FIGS. 3 to 5 is omitted.

The article movement recognition part 201 is connected to, for example, a "button (article take-out notification apparatus)" that is pressed when the operator of the mobile body 10 takes out the article, and detects the press of the button. In the article position estimation system, an operation rule of "pressing a button when taking out an article" is defined.

When detecting the press of the button, the article movement recognition part 201 generates "article movement information". In the second exemplary embodiment, since the article take-out position is estimated by the mobile body 10, the article movement information includes at least a time point (article take-out time point) at which the mobile body 10 takes out the article from a predetermined place. In this way, the article movement recognition part 201 recognizes that the article is taken out from the predetermined position, and generates article movement information including the article take-out time point which is a time when the article is taken out.

The article movement information is stored in the storage part 205. The information provision part 206 reads the article movement information from the storage part 205 and transmits it together with other information to the article position estimation apparatus 20.

The article position estimation apparatus 20 estimates the article take-out position by the mobile body 10 due to the same method as the method described in the first exemplary embodiment.

Concretely, the position change information generation part 303 generates information related to a change amount in the position of the mobile body 10 between the reference point recognition time point and the article take-out time point based on the movement history information, the reference point recognition time point, and the article take out time point.

The article position estimation part 304 estimates a position of the mobile body 10 at the article take-out time point based on the position of the mobile body 10 at the reference point recognition time point and the change amount in the position of the mobile body 10 between the reference point recognition time point and the article take-out time point. In this way, the article position estimation apparatus 20 according to the second exemplary embodiment can estimate the article take-out position by the mobile body 10. That is, the article position estimation apparatus 20 can estimate where the article had been placed, when the mobile body 10 took out the article from an article storage area. At that time, the position change information generation part 303 calculates the change amount in the position of the mobile body 10 in the minimum movement range in which the article take-out position by the mobile body 10 can be estimated, as in the first exemplary embodiment. Therefore, the power consumption required for position estimation can be reduced.

As in the first exemplary embodiment, when the accuracy of the article position estimation (take-out position estimation) is not required, the article position estimation apparatus 20 estimates the article take-out position without using the change amount in the position of the mobile body 10.

As described above, the article position estimation apparatus 20 acquires "article movement information" from the mobile body 10. The article position estimation apparatus 20 can estimate the article take-out position by the mobile body 10 reflecting the change amount in the position of the mobile body 10 between the article take-out time point and the reference point recognition time point in the absolute coordinate of the reference point recognized before and after the article take-out time point. As a result, in the second exemplary embodiment, it is easy to perform a management where the article was placed and a management whether the article is placed in a particular place (whether the particular place is empty or not).

Below, as an example of a method of managing the article placement position, a creation of a warehousing/shipping ledger and a generation of an article position map will be described.

When managing the article placement position, a database that stores the article placement position (coordinate, direction, all or part of area), the article placement completion time point, and the article identifier (for example, barcode number or character string) as one record, is prepared. At that time, as the stored information in the database, it is also possible to record the article take-out position instead of the article placement position, or both. When recording both the article placement position and the article take-out position, for example, a flag of distinguishing between placement and take-out may be used.

After that, the management apparatus searches the database using the position (coordinate, direction, all or part of area) as a key, and obtains a time point and identifier of the article placed at the position. In the position search by the management apparatus, the breadth of the search position may be selected by specifying the coordinate range due to a comparison operator or the like. Also, the management apparatus may narrow down a search range by using with a time point as the search key. The management apparatus creates a list of time points and identifiers of the articles placed or taken out at the search position as a warehousing/ shipping ledger based on the search result.

Alternatively, the management apparatus can receive a time point as an input and create a list of article placement positions at the time point as an article position map. At this time, when the article in the placed state at the time point and the article in the taken-out state are mixed, the management apparatus can also display these states separately. Concerning the determination of the placement state and the take-out state of the article, the management apparatus can distinguish whether the state in which the article was last recorded before the designated time point is either placement or take-out.

Modification Example

The configuration and operation of the article position estimation system described in the above exemplary embodiment are shown exemplarily, and various modifications are possible. For example, the article position estimation system may have the following configuration or operation.

Figure 11:
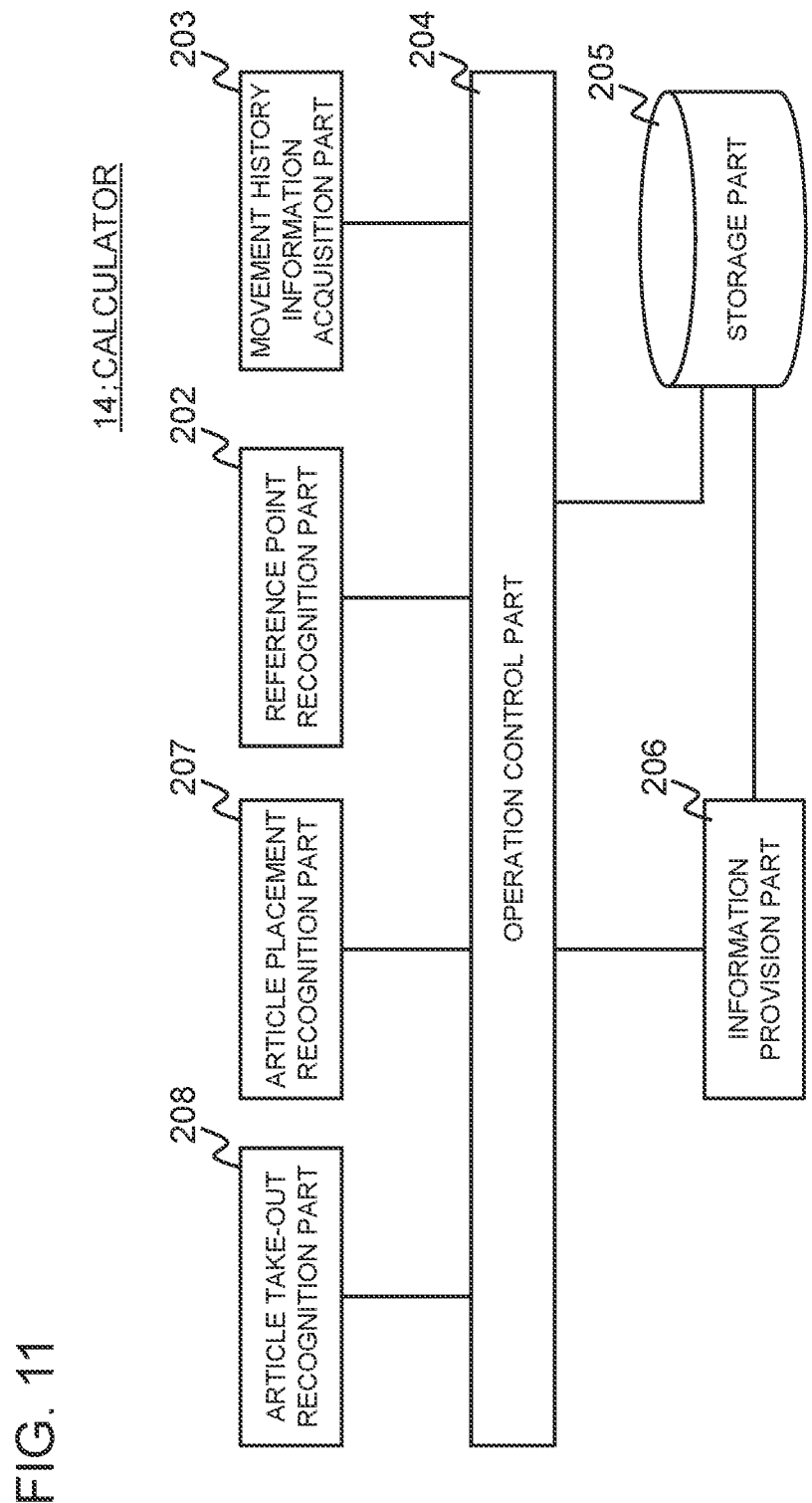
FIG. 11 is a diagram showing one example of another processing configuration of a calculator of a mobile body.

In the first and second exemplary embodiments, although the article placement position estimation and the article take-out position estimation have been described, respectively, these two estimations may be performed together. In this case, as shown in FIG. 11, the calculator 14 of the mobile body 10 may comprise the article placement recognition part 207 and the article take-out recognition part 208. The article placement recognition part 207 can operate in the same manner as the article movement recognition part 201 described in the first exemplary embodiment, and the article take-out recognition part 208 can operate in the same manner as the article movement recognition part 201 described in the second exemplary embodiment, so the description is omitted.

In FIG. 2, although the article position estimation apparatus 20 is placed (placed outside) separately from the mobile body 10, an equivalent function may be implemented inside the mobile body 10. In this case, if necessary, information related to the article placement position is acquired from the mobile body 10.

When the article position estimation apparatus 20 is arranged outside the mobile body 10, it is conceivable that the article position estimation apparatus 20 is implemented as a program on the on-premises server or a program on the cloud service.

When the article position estimation apparatus 20 is arranged inside the mobile body 10, it is conceivable that the article position estimation apparatus 20 is implemented as a program on a single board computer, a smartphone, or a wearable device.

In FIG. 4, although the storage part 205 is arranged inside the mobile body 10, an example in which the storage part 205 is arranged both inside and outside the mobile body 10 can be considered. For example, it is conceivable that the article movement information, the reference point recognition information, and the movement history information are recorded in the recording device inside the mobile body 10, and the pair of the identification information and the coordinate information of each reference point is recorded in the recording device outside the mobile body 10.

Various apparatuses may be implemented to be centrally mounted in one apparatus or distributed in a plurality of apparatuses.

For example, when using a camera for article placement recognition, reference point recognition, and movement history calculation, respectively, a method of using one camera for all use (means) and a method of using two or more cameras each for each means are conceivable.

When using a camera, an implementation that the camera is fixedly placed on a forklift or a transport cart, an implementation that a person as a mobile body wears the camera, or a method that the camera is held in the hand, is conceivable. The camera may be a general digital camera, a small Web camera, a camera with a built-in smartphone, a camera with a built-in wearable device, or the like.

As a method of recording information in the storage part 205, a method of each of the article movement recognition part 201, the reference point recognition part 202, and the movement history information acquisition part 203, or a method of relaying by the operation control part 204 are conceivable.

As a method of acquiring information from the storage part 205, a method of directly acquiring the information by the article position estimation apparatus 20 without using the information provision part 206, a method of relaying the information by the operation control part 204, and the like are conceivable.

As a timing at which the position estimation by the article position estimation apparatus 20, when the article movement recognition part 201 recognizes the article placement; when the reference point recognition part 202 detects the reference point; when the article movement information or the reference point recognition information is written to the storage part 205; and the like are conceivable. Alternatively, as the above timing, when the periodic timer of the article position estimation apparatus 20 expires; and when the program of acquiring the change amount in the position of the mobile body 10 detects a particular operation (stopping operation, etc.) of the mobile body 10 are conceivable. Alternatively, as the above timing, when an external trigger instructing the execution of the article position estimation apparatus 20 is given may be used.

As the operations of the article movement recognition part 201, the reference point recognition part 202, the movement history information acquisition part 203, and the operation control part 204, a case of completing inside the mobile body 10; and a case of accompanying communication with the outside of the mobile body 10 are conceivable.

The mobile body 10 may transmit all the reference point information and the movement history information to the article position estimation apparatus 20, and the article position estimation apparatus 20 may select necessary information.

In the above exemplary embodiment, the movement trajectory of the mobile body 10 is calculated at the time of relative movement estimation (estimation of the change amount of the mobile body 10). However, the position change information generation part 303 may calculate an area (movable area) that the mobile body 10 can take. For example, the position change information generation part 303 calculates a result of multiplying the movement speed (for example, the maximum speed or the average speed) of the mobile body 10 by the movement time (for example, the difference between the reference point recognition time point and the article placement completion time point) as a movement radius of the mobile body 10. In this case, the article position estimation part 304 calculates the area (inside the circle) where the position of the mobile body 10 at the reference point recognition time point is a center of the circle and the movement radius is a radius of the circle, as the article placement position by the mobile body 10. That is, as the article placement position, not only the coordinate and direction of the mobile body 10 but also the area that the mobile body 10 can take is introduced, and the article position estimation apparatus 20 may be determined that the article is placed anywhere inside the circle for which the position at the reference point recognition time point is a center and the movement radius is a radius. The movement speed of the mobile body 10 may be stored in the article position estimation apparatus 20 as a constant in advance, or the mobile body 10 may calculate the speed and notify the article position estimation apparatus 20. Again, the article placement position (as well as the article take-out position) may be estimated as an area represented by a circle rather than a point.

That is, the article position estimation apparatus 20 may calculate an area that the mobile body 10 can take without calculating a movement trajectory of the mobile body 10 by the relative movement estimation. As explained above, a power consumption required for estimating a relative movement amount is large. However, if the article position estimation apparatus 20 calculates only a movement radius, the calculation can be performed at a high speed and with a low power consumption. Also, when the movement radius is used for estimating the article placement position and the article taking-out position, the article position is fixed to a value at the reference point recognition time point, and an area (movement radius) that the mobile body 10 can take, will change depending on the time. By adopting such article position estimation, even if the estimation accuracy of the article placement position and the article take-out position becomes low, the time and power required for the relative movement amount estimation can be significantly reduced, so there is a great advantage depending on the use case of the system.

Although the industrial applicability of the present invention is clear from the above description, the present invention can be suitably applied to: an efficiency of an article management work; an efficiency of an article storage position management; an efficiency of an article inventory; a commodity management system; an efficiency of a commodity placement position management; a map creation system; and the like. Alternatively, the present invention can be suitably applied to applications such as reflecting an equipment and an apparatus placed on a floor on a floor map.

Some or all of the above exemplary embodiments may also be described as the following modes, but not limited to the following modes.

[Mode 1]

It is as the article position estimation system according to the first aspect described above.

[Mode 2]

The article position estimation system preferably according to mode 1, further comprising:
- a movement history information acquisition part that acquires movement history information related to movement of the mobile body; and
- a position change information generation part that generates information related to an change amount in the position of the mobile body between the reference point recognition time point and the article movement time point, based on the movement history information, the reference point recognition time point and the article movement time point,
- wherein the article position estimation part estimates the position of the mobile body at the article movement time point, based on the position of the mobile body at the reference point recognition time point, and the change amount in the position of the mobile body between the reference point recognition time point and the article movement time point.

[Mode 3]

The article position estimation system preferably according to mode 2, wherein the position change information generation part calculates the change amount in the position of the mobile body in a minimum movement range in which the position of the mobile body at the article movement time point can be estimated.

[Mode 4]

The article position estimation system preferably according to mode 3, wherein the position change information generation part uses the movement history information acquired between a reference point recognition time point immediately before the article movement time point and the article movement time point to generate information related to the change amount in the position of the mobile body.

[Mode 5]

The article position estimation system preferably according to mode 3, wherein the position change information generation part uses the movement history information acquired between a reference point recognition time point immediately after the article movement time point and the article movement time point to generate information related to the change amount in the position of the mobile body.

[Mode 6]

The article position estimation system preferably according to mode 3, wherein the position change information generation part compares a first movement history information acquired between a reference point recognition time point immediately before the article movement time point and the article movement time point, and a second movement history information acquired between a reference point recognition time point immediately after the article movement time point and the article movement time point; and
uses movement history information having a small data size to generate information related to the change amount in the position of the mobile body.

[Mode 7]

The article position estimation system preferably according to any one of modes 2 to 6, wherein the article position estimation part changes a manner of usage of the change amount in the position of the mobile body reflected in the position of the mobile body, based on a before/after relationship between the reference point recognition time point and the article movement time point.

[Mode 8]

The article position estimation system preferably according to mode 7, wherein the article position estimation part reflects the change amount in forward direction related to the position of the mobile body at the reference point recognition time point at which the reference point recognition time point is earlier than the article movement time point; and reflects the change amount in backward direction related to the position of the mobile body at the reference point recognition time point at which the reference point recognition time point is later than the article movement time point.

[Mode 9]

The article position estimation system preferably according to any one of modes 2 to 8, wherein the position change information generation part calculates a distance that the mobile body can move from a reference point as a movement radius;
the article position estimation part estimates a range in which the position of the mobile body at the reference point recognition time point is a center of a circle and the movement radius is a radius of the circle as the position of the mobile body at the article movement time point.

[Mode 10]

The article position estimation system preferably according to any one of modes 1 to 9, wherein the reference point recognition information includes a feature value extracted from an image taken at the time of reference point recognition by a camera.

[Mode 11]

The article position estimation system preferably according to any one of modes 2 to 10, wherein the movement history information is a set having a pair of an image taken by a camera and an acquisition time of the taken image as an element.

[Mode 12]

A program: causing a computer to execute:
generating article movement information including an article movement time point that is a time point when an article is taken out by a mobile body or a time point when the article placement is completed by the mobile body;
recognizing a reference point and generating reference point recognition information including identification information according to the recognized reference point, a reference point recognition time point, and information related to the recognized reference point;
generating information related to a position of the mobile body at the reference point recognition time point based on the reference point recognition information; and
estimating the position of the mobile body at the article movement time point by using at least the position of the mobile body at the reference point recognition time point.

This program can be recorded on a computer-readable storage medium.

The storage medium may be a non-transient such as a semiconductor memory, a hard disk, a magnetic recording medium, or an optical recording medium. The present invention can also be embodied as a computer program product.

[Mode 13]

It is as the article position estimation method according to the second aspect described above.

The modes of Modes 12 and 13 can be expanded to the modes of Modes 2 to 11 in the same manner as the mode of Mode 1.

The disclosures of the above-mentioned patent literatures cited shall be incorporated into the present application by reference. Within the framework of the entire disclosure (including claims) of the present invention, it is possible further to change or adjust the exemplary embodiments or examples based on the basic technical idea thereof. Also, within the framework of the entire disclosure of the present invention, it is possible to perform various combinations or selections (including partial deletion) of various disclosure elements (including each element of each claim, each element of each exemplary embodiment or example, each element of each drawing, etc.). That is, it is needless to say that the present invention includes: the entire disclosure including claims; and various modifications and modifications that can be made by one person skilled in the art in accordance with the technical concept. In particular, with respect to the numerical range(s) described in this document, it should be interpreted that any numerical value or small range included in the numerical range is concretely described even if there is no explicit description. Further, matters using each of the disclosed matters of the above-cited literatures in combination with the matters described in this document in part or in whole as a part of the disclosure of the present invention, in accordance with the purpose of the present invention, if necessary, are regarded to be included in (belonging to) the matters disclosed in the present application.

REFERENCE SIGNS LIST

10 Mobile body
11 Article transportation placement apparatus
12 Article movement notification apparatus
13 External situation acquisition apparatus
14 Calculator
20 Article position estimation apparatus
21 CPU (Central Processing Unit)
22 Memory
23 I/O interface
24 Communication circuit
101, 201 Article movement recognition part
102, 202 Reference point recognition part
103, 302 Position information generation part
104, 304 Article position estimation part
203 Movement history information acquisition part
204 Operation control part 205 Storage part
206 Information provision part
207 Article placement recognition part
208 Article take-out recognition part
301 Information acquisition part
303 Position change information generation part

What is claimed is:

1. An article position estimation system, comprising:
an article movement recognition part configured to generate article movement information including an article movement time point that is a time point when an article is taken out by a mobile body or a time point when the article placement is completed by the mobile body;
a reference point recognition part configured to recognize a reference point and generate reference point recognition information including: identification information according to the recognized reference point, and a reference point recognition time point;
a position information generation part configured to generate information including a position of the mobile body at the reference point recognition time point based on the reference point recognition information;
an article position estimation part configured to estimate the position of the mobile body at the article movement time point by using at least the position of the mobile body at the reference point recognition time point;
a movement history information acquisition part configured to acquire movement history information including movement of the mobile body;
a position change information generation part configured to generate information including a change amount in the position of the mobile body between the reference point recognition time point and the article movement time point, based on the movement history information, the reference point recognition time point, and the article movement time point,
wherein the article position estimation part estimates the position of the mobile body at the article movement time point based on the position of the mobile body at the reference point recognition time point and the change amount in the position of the mobile body between the reference point recognition time point and the article movement time point, and
wherein the position change information generation part is configured to calculate the change amount in the position of the mobile body in a minimum movement range in which the position of the mobile body at the article movement time point can be estimated; and
wherein the position change information generation part is further configured to:
determine a movement history information having a smaller data size of a first movement history information and a second movement history information by comparing the first movement history information acquired between a reference point recognition time point immediately before the article movement time point and the article movement time point, and the second movement history information acquired between a reference point recognition time point immediately after the article movement time point and the article movement time point; and
use the movement history information having the smaller data size of the first movement history information and the second movement history information to generate the information including the change amount in the position of the mobile body.

2. The article position estimation system according to claim 1, wherein the position change information generation part is further configured to use the movement history information acquired between a reference point recognition time point immediately before the article movement time point and the article movement time point to generate the information including the change amount in the position of the mobile body.

3. The article position estimation system according to claim 2, wherein the article position estimation part is further configured to change a manner of usage of the change amount in the position of the mobile body reflected in the position of the mobile body, based on a before/after relationship between the reference point recognition time point and the article movement time point.

4. The article position estimation system according to claim 3, wherein the article position estimation part is further configured to:
reflect the change amount in forward direction relative to the position of the mobile body at the reference point recognition time point at which the reference point recognition time point is earlier than the article movement time point; and
reflect the change amount in backward direction relative to the position of the mobile body at the reference point recognition time point at which the reference point recognition time point is later than the article movement time point.

5. The article position estimation system according to claim 2, wherein:
the position change information generation part is further configured to calculate a distance that the mobile body can move from a reference point as a movement radius; and
the article position estimation part is further configured to estimate a range in which the position of the mobile body at the reference point recognition time point is a center of a circle and the movement radius is a radius of the circle as the position of the mobile body at the article movement time point.

6. The article position estimation system according to claim 1, wherein the position change information generation part is further configured to use the movement history information acquired between a reference point recognition time point immediately after the article movement time point and the article movement time point to generate the information including the change amount in the position of the mobile body.

7. The article position estimation system according to claim 6, wherein the article position estimation part is further configured to change a manner of usage of the change amount in the position of the mobile body reflected in the position of the mobile body, based on a before/after relationship between the reference point recognition time point and the article movement time point.

8. The article position estimation system according to claim 7, wherein the article position estimation part is further configured to:
reflect the change amount in forward direction relative to the position of the mobile body at the reference point recognition time point at which the reference point recognition time point is earlier than the article movement time point; and
reflect the change amount in backward direction relative to the position of the mobile body at the reference point recognition time point at which the reference point recognition time point is later than the article movement time point.

9. The article position estimation system according to claim 6, wherein:
the position change information generation part is further configured to calculate a distance that the mobile body can move from a reference point as a movement radius; and
the article position estimation part is further configured to estimate a range in which the position of the mobile body at the reference point recognition time point is a center of a circle and the movement radius is a radius of the circle as the position of the mobile body at the article movement time point.

10. The article position estimation system according to claim 1, wherein the article position estimation part is further configured to change a manner of usage of the change amount in the position of the mobile body reflected in the position of the mobile body, based on a before/after relationship between the reference point recognition time point and the article movement time point.

11. The article position estimation system according to claim 10, wherein the article position estimation part is further configured to:
reflect the change amount in forward direction relative to the position of the mobile body at the reference point recognition time point at which the reference point recognition time point is earlier than the article movement time point; and
reflect the change amount in backward direction relative to the position of the mobile body at the reference point recognition time point at which the reference point recognition time point is later than the article movement time point.

12. The article position estimation system according to claim 1, wherein:
the position change information generation part is further configured to calculate a distance that the mobile body can move from a reference point as a movement radius; and
the article position estimation part is further configured to estimate a range in which the position of the mobile body at the reference point recognition time point is a center of a circle and the movement radius is a radius of the circle as the position of the mobile body at the article movement time point.

13. The article position estimation system according to claim 1, wherein the article position estimation part is further configured to change a manner of usage of the change amount in the position of the mobile body reflected in the position of the mobile body, based on a before/after relationship between the reference point recognition time point and the article movement time point.

14. The article position estimation system according to claim 13, wherein the article position estimation part is further configured to:
reflect the change amount in forward direction relative to the position of the mobile body at the reference point recognition time point at which the reference point recognition time point is earlier than the article movement time point; and
reflect the change amount in backward direction relative to the position of the mobile body at the reference point recognition time point at which the reference point recognition time point is later than the article movement time point.

15. An article position estimation method in an article position estimation system comprising a mobile body, the article position estimation method comprising:
generating article movement information including an article movement time point that is a time point when an article is taken out by a mobile body or a time point when the article placement is completed by the mobile body;
recognizing a reference point and generating reference point recognition information including: identification information according to the recognized reference point, and a reference point recognition time point;
generating information including a position of the mobile body at the reference point recognition time point based on the reference point recognition information;
estimating the position of the mobile body at the article movement time point by using at least the position of the mobile body at the reference point recognition time point;
acquiring movement history information including movement of the mobile body; and
generating information including a change amount in the position of the mobile body between the reference point recognition time point and the article movement time point, based on the movement history information, the reference point recognition time point, and the article movement time point,
wherein the position of the mobile body at the article movement time point is estimated based on the position of the mobile body at the reference point recognition time point and the change amount in the position of the mobile body between the reference point recognition time point and the article movement time point, and
wherein the change amount in the position of the mobile body is calculated in a minimum movement range in which the position of the mobile body at the article movement time point can be estimated; and
wherein generating information including a position of the mobile body at the reference point recognition time point based on the reference point recognition information includes:
determining a movement history information having a smaller data size of a first movement history information and a second movement history information by comparing the first movement history information acquired between a reference point recognition time point immediately before the article movement time point and the article movement time point, and the second movement history information acquired between a reference point recognition time point immediately after the article movement time point and the article movement time point; and
using the movement history information having the smaller data size of the first movement history information and the second movement history information to generate the information including the change amount in the position of the mobile body.

* * * * *